United States Patent
Kimura et al.

[11] Patent Number: 6,061,312
[45] Date of Patent: May 9, 2000

[54] DISK REPRODUCING APPARATUS CONTROLLING READ SIGNAL FROM A DISK BY USING DEMODULATED IDENTIFYING SIGNAL AND STORED IDENTIFYING SIGNAL IN A MEMORY

[75] Inventors: Izumi Kimura; Munehiro Nishioka; Toshifumi Takeuchi; Hiroshi Tadokoro, all of Yokohama, Japan

[73] Assignee: Hitachi, Ltd, Tokyo, Japan

[21] Appl. No.: 09/039,382

[22] Filed: Mar. 16, 1998

Related U.S. Application Data

[63] Continuation of application No. 08/797,305, Feb. 7, 1997, Pat. No. 5,740,144, and a continuation of application No. 08/181,542, Jan. 14, 1994, Pat. No. 5,615,194.

[30] Foreign Application Priority Data

Jan. 21, 1993 [JP] Japan ..................................... 5-008138

[51] Int. Cl.[7] ...................................... G11B 5/09
[52] U.S. Cl. ................................. 369/47; 369/48
[58] Field of Search ................................. 369/54, 47, 48, 369/49, 59, 50, 60

[56] References Cited

U.S. PATENT DOCUMENTS

| | | |
|---|---|---|
| 4,536,864 | 8/1985 | Van Rosmalen . |
| 4,656,525 | 4/1987 | Norris . |
| 4,712,141 | 12/1987 | Tomohisa et al. . |
| 4,905,095 | 2/1990 | Yamada . |
| 5,057,923 | 10/1991 | Matsuda . |
| 5,099,464 | 3/1992 | Maeda . |
| 5,134,598 | 7/1992 | Nagano . |
| 5,159,143 | 10/1992 | Emi et al. . |
| 5,166,804 | 11/1992 | Takahashi . |
| 5,214,717 | 5/1993 | Kimura et al. . |
| 5,221,976 | 6/1993 | Dash et al. . |
| 5,224,089 | 6/1993 | Matsumura et al. . |
| 5,253,118 | 10/1993 | Konno . |
| 5,291,467 | 3/1994 | Ishiwata et al. . |
| 5,313,443 | 5/1994 | Iitsuka ........................................ 369/48 |
| 5,317,553 | 5/1994 | Ohga et al. . |
| 5,345,433 | 9/1994 | Ohga et al. . |
| 5,361,263 | 11/1994 | Urbansky . |
| 5,390,052 | 2/1995 | Kato et al. . |
| 5,453,964 | 9/1995 | Shimizume . |
| 5,463,607 | 10/1995 | Roth et al. . |
| 5,615,194 | 3/1997 | Kimura et al. ............................. 369/60 |

FOREIGN PATENT DOCUMENTS

| | | |
|---|---|---|
| 0249781 | 12/1987 | European Pat. Off. . |
| 0260722 | 3/1988 | European Pat. Off. . |
| 0400810 | 12/1990 | European Pat. Off. . |
| 0440224 | 8/1991 | European Pat. Off. . |
| 0553841 | 8/1993 | European Pat. Off. . |
| 0563922 | 10/1993 | European Pat. Off. . |
| 62-150560 | 7/1987 | Japan . |
| 3207056 | 9/1991 | Japan . |
| 4360067 | 12/1992 | Japan . |
| 696529 | 4/1994 | Japan . |

*Primary Examiner*—Thang V. Tran
*Attorney, Agent, or Firm*—Antonelli, Terry, Stout & Kraus, LLP

[57] ABSTRACT

A disk reproducing apparatus is provided which can cope with the intermittent access due to track jump in the conventional CD reproducing system and which can reproduce data at N times the normal speed and produce the reproduced data at the normal speed. The disk reproducing apparatus includes a memory for storing the data and time information reproduced from the disk to match with each other, another external memory, a detection circuit detecting the time difference between the finally produced output data and the data which is being accessed, and a control circuit detecting the overflow/underflow of the external memory and controlling it to be written. The construction can absorb the time difference between the system operation speed and data output speed even during an intermittent access so that continuous data can be produced.

6 Claims, 7 Drawing Sheets

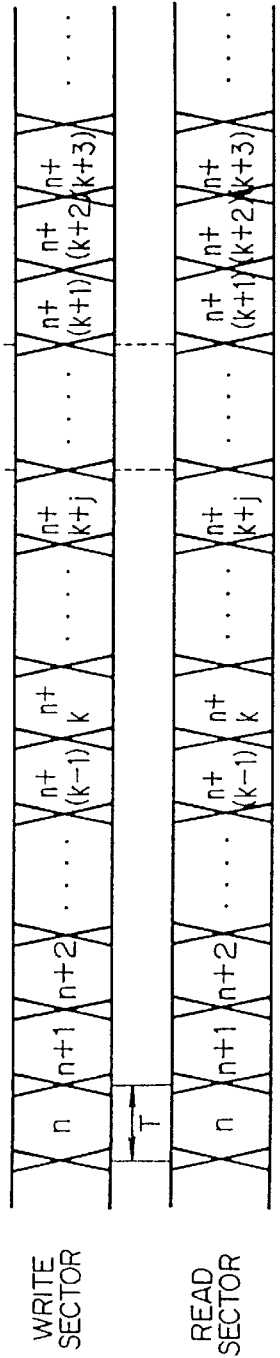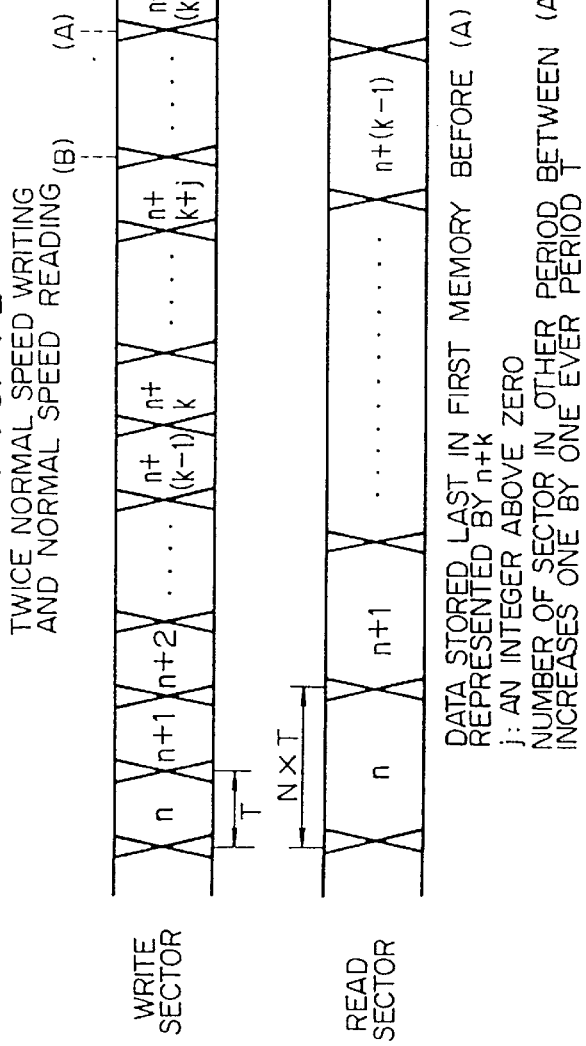

DISK REPRODUCING APPARATUS CONTROLLING READ SIGNAL FROM A DISK BY USING DEMODULATED IDENTIFYING SIGNAL AND STORED IDENTIFYING SIGNAL IN A MEMORY

REFERENCE TO EARLIER FILED APPLICATION(S)

This application is a continuation of the following earlier filed application Ser. No. 08/797,305 filed Feb. 7, 1997, issued as U.S. Pat. No. 5,740,144; and Ser. No. 08/181,542 filed Jan. 14, 1994, issued as U.S. Pat. No. 5,615,194.

BACKGROUND OF THE INVENTION

1. Field of the Invention

The present invention relates to a disk reproducing apparatus, and particularly to a disk reproducing technique suitable for use in reproducing at an N time normal speed a disk on which an audio signal as main information is recorded together with a subcode of time information or the like, such as a digital audio disk.

2. Description of the Related Art

There is known an example of reproduction in which an intermittent access is made when the information reading means is inadvertently moved by an external force or the like upon N-time normal speed reproduction of a disk where N is a positive integer. That is, as described in JP-A-62-150560, digital audio data reproduced from a compact disk (CD) is written in a memory, but when the information reading means is advertently skipped over tracks, it is moved back to the previous position from which it was skipped over tracks. At this time, the data reproduced from the disk is stopped from being written in the memory, and the memory is read at a constant period of the sampling frequency. Thus, the digital-to-analog converted data can be continuously reproduced.

In this prior art, during the period in which the information reading means is inadvertently moved, or skipped over tracks and then moved back to the original correct position, no noise occurs, and the reproduction is not intermitted, or is not abnormally made. However, data control is not made for making data precisely continuous. This is because although the subcode of time information is produced timely with the disk reading operation, the audio data is once written in the memory in order that the rotation irregularity of the disk can be absorbed, and read under the control of a crystal oscillation frequency. Thus, the subcode and the audio data cannot be precisely coincident in one-to-one correspondence.

SUMMARY OF THE INVENTION

Accordingly, it is an object of the present invention to provide a disk reproducing apparatus capable of precisely coinciding the subcode with the audio data in one-to-one correspondence and making the data precisely continuous by use of the resulting audio data and subcode.

It is another object of the present invention to provide a disk reproducing apparatus in which the switching for the equalizer and clock reproduction is not necessary for the N-time normal speed output and the normal speed output because the subcode and the audio data are coincident in one-to-one correspondence, and because the data can be made continuous by use of the resulting audio data and subcode even when the data is read intermittently from the disk.

According to one feature of the present invention, there is provided a disk reproducing apparatus which includes processing means for demodulating the modulated information data and the subcode read by the information reading means, making a certain process to detect or correct error of the information data, and producing the information data and the subcode, first memory means for storing the information data or the information and subcode from the processing means and producing the information data, and first control means for controlling a write address and read address to the first memory means, the processing means including second memory means for storing the information data and the subcode in order to absorb a rotation irregularity of the disk, and second control means for controlling a write address and read address to the second memory means, the write address and read address to the second memory means being generated from the second control means in order to deinterleave and read the information data which has been interleaved upon recording and that particular one of the information data and particular one of the subcode can be read in one-to-one correspondence.

According to another feature of the present invention, the first control means for controlling the write address and read address to the first memory means includes first detecting means for detecting first sector information which indicates an address at which the information data is written in the first memory means from the subcode which is produced from the processing means through the second memory means, second detecting means for detecting second sector information which indicates an address at which the information data is read from the first memory means, third detecting means for detecting the overflow and underflow of the data stored in the first memory means by comparing the detected first sector information and second sector information, third control means for inhibiting the first memory means from being written when the third detecting means detects the overflow and produces the resulting output, fourth control means for moving the reading means to a position of next data continuous to the previous data according to the first sector information when the first memory means is inhibited from being written, and fifth control means for releasing the first memory means from the write-inhibited state, thereby enabling the first memory means to be written when the third detecting means detects the underflow and produces the resulting output, a first clock frequency for determining the speed at which a data is written in the first memory means corresponds to N times the normal speed, and a second clock frequency for determining the speed at which a data is read from the first memory means corresponds to the normal speed.

According to the above features of the present invention, since the processing means having the second control means is provided, the subcode can be written in and read from the second memory means, the subcode and information data on the disk can be maintained to be matched with each other since the disk rotation irregularity can be absorbed from both the subcode and information data.

In addition, since the first control means and the first memory means are provided, the data reproduced from the disk which is rotating at N time normal speed can be buffered and the reproduced data can be continuously read from the memory means at the normal speed.

BRIEF DESCRIPTION OF THE DRAWINGS

FIGS. 7A and 7B are respectively timing charts for the twice normal speed CD-ROM writing and reading and for the twice normal speed writing and normal speed reading.

DESCRIPTION OF THE PREFERRED EMBODIMENTS

Figure 1:
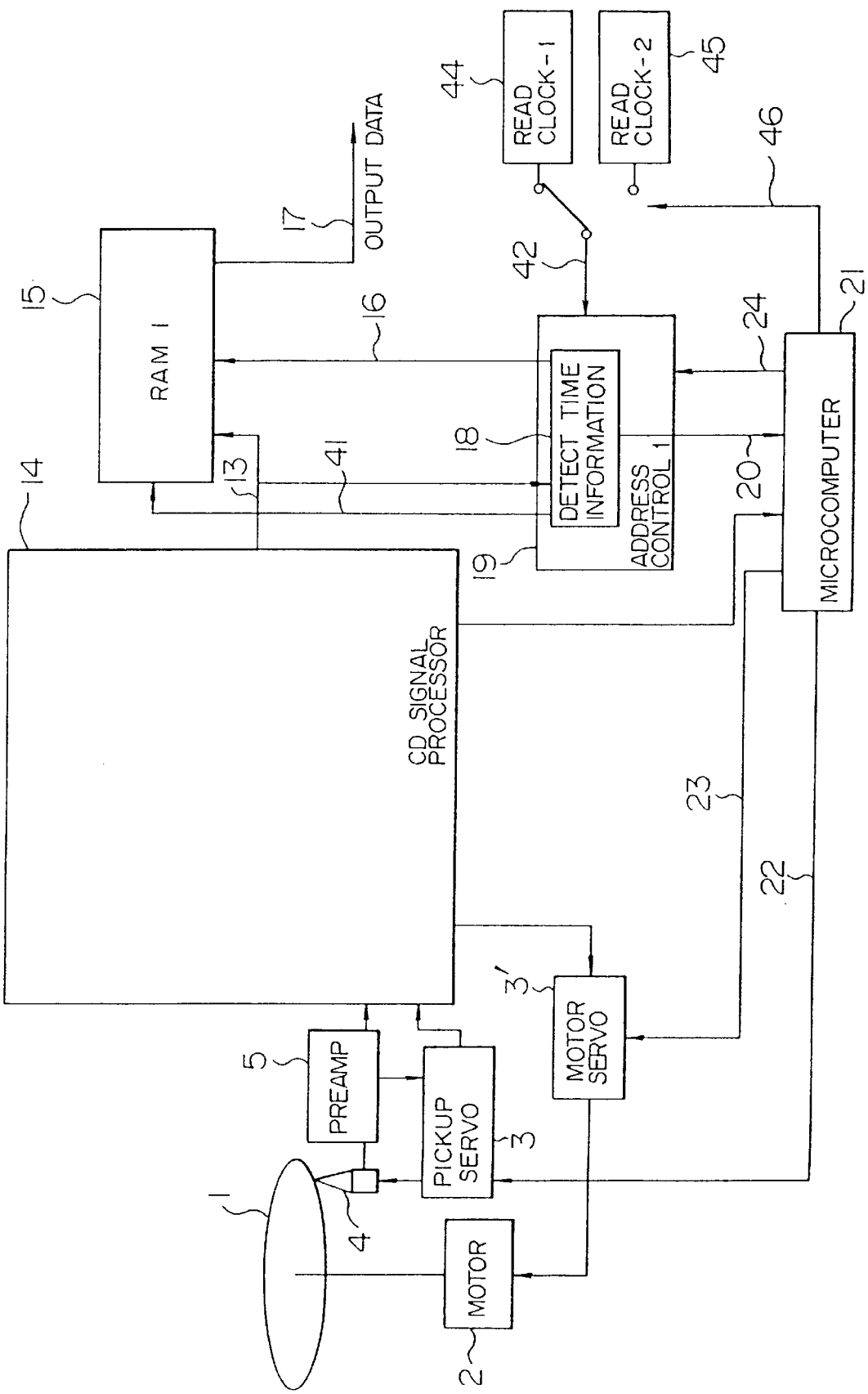
FIG. 1 is a block diagram of a disk reproducing apparatus with an external RAM according to the present invention.
Figure 2:
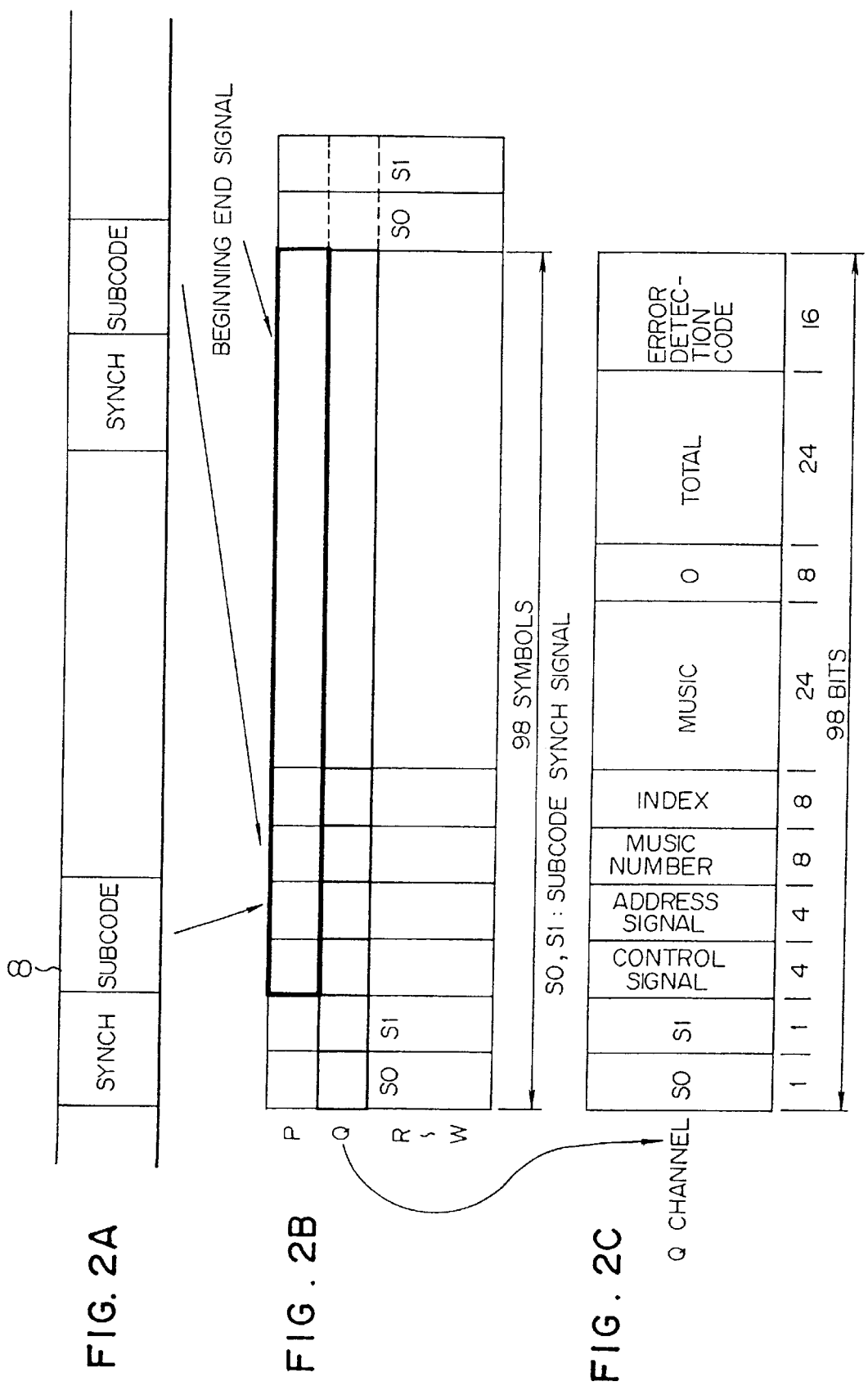
FIGS. 2A–2C are diagrams showing the subcode format of CD.

An embodiment of a compact disk (CD) reproducing apparatus of the present invention will be described with reference to FIG. 1 showing the CD reproducing apparatus and FIG. 2 showing the subcode format of the CD.

Referring to FIG. 1, there are shown a disk 1, a motor 2 for rotating the disk, a pickup servo circuit 3, a motor servo circuit 3', a pickup 4 for reading data from the disk, a preamplifier 5, a subcode 8 including time information, access data 13 including audio data passed through a certain process and the subcode added to the audio data, a CD signal processing circuit 14 for making a certain process on the data reproduced from the disk, adding the subcode to the data, and producing the subcode-added data, a RAM-1 15 for storing the access data 13, address information 16 to the RAM-1 15, output data 17, and a time information detector 18 for detecting the time information from the access data 13 and from read information 24 sent from a microcomputer 21. In addition, there are shown an address control circuit-1 19 including the time information detector 18, overflow/underflow information 20 of the RAM-1 15 from the time information detector 18, the system control microcomputer 21, intermittent access information 22, 23 based on the overflow/underflow information 20, the information 24 read from the disk, a read clock 42 by which a data is read from the RAM-1, a read clock generator-1 44 for generating the read clock for normal speed reading, a read clock generator-2 45 for generating the read clock for N-time normal speed reading, and a switching signal for the read clocks.

The digital signal reproduced from the CD includes the audio data and the subcode. This subcode, as shown in FIG. 2A, is arranged in the area just after each frame synchronizing signal and is composed of 8 different channels of P through W as shown in FIG. 2B. Each group of 98 subcodes (i.e. subcodes for 98 frames) included as subcodes S0, S1 at the beginning of each frame establishes significant data. As shown in FIG. 2C, the Q-channel of the subcode has the time information and a control signal recorded, and an error detection code added so that the subcode can be reproduced with high reliability.

The operation of the CD reproducing apparatus with the above mentioned construction will be described below.

Referring to FIG. 1, the disk 1 is rotated at a N-time normal speed by the motor 2. The pickup 4 is controlled to read data by the pickup servo 3. The read data from the pickup is supplied through the preamplifier 5 to the CD signal processing circuit 14. The reproduced data is processed by the CD signal processing circuit 14, and as a result the CD signal processing circuit 14 produces at N times the normal output rate the access data 13 of the audio data having the subcode 8 which includes the time information.

The access data 13 of N-time normal output rate thus produced is supplied to the RAM-1 15 where it is written, and the stored data is read at the normal speed (one time normal speed), under the control of the address control circuit-1 19.

Here, the operation of the address control circuit-1 19 and the peripheral circuits will be described in detail. The address control circuit-1 19 generates a write address and read address 16 to the RAM-1 15, and the system control microcomputer 21 decides from the subcode 8 whether the information from the audio disk is data or audio data. As a result, the system control microcomputer 21 produces the switching control signal 46 for selecting the read clock generator-1 for normal speed. Thus, the access data 13 produced at the N-time normal speed output rate from the CD signal processing circuit 14 and stored in the RAM-1 15 is read from the RAM-1 15 at the normal speed. In other words, since the CD signal processing circuit 14 operates at the N-time normal speed, the access data is written in the RAM-1 15 at N times the normal speed, while the stored data is read from the RAM-1 15 at the normal speed (one time normal speed). In this situation, since data overflows from the RAM before all data are read, the address control circuit-1 19 including the time information detector 18 and the system control microcomputer 21 control the writing and reading operations. The time information detector 18 of the address control circuit-1 19 detects the time information at the time of writing on the basis of the access data 13, and at the same time it detects the time difference information between the writing and reading operations on the basis of the disk read information 24, in order to check whether the RAM-1 15 overflows with data or not on the basis of the detection result of the time difference information. If the overflow is detected, it produces the information 41 for inhibiting data from being written in the RAM-1 15, thereby stopping the writing operation, and supplies the overflow information 20 to the system control microcomputer 21. The system control microcomputer 21 produces intermittent access information 22, 23 on the basis of this overflow information 20 and the time information at the time of writing inhibition. As a result, the pickup servo 3 controls the pickup 4 to move to the position on the disk where next data can be made continuous to the previous one. If the underflow is detected, the time information detector 18 produces the information 41 for releasing the RAM-1 15 from the writing-inhibited state, and supplies the underflow information 20 for reaccess to the disk to the system control microcomputer 21. Thus, the pickup 4 reads next data for continuation from the disk, and after each process the read data is again started to be written in the RAM-1 15.

According to this embodiment, the data produced at N times the normal output rate from the CD signal processing circuit 14 is once stored in the external RAM, and read therefrom at the normal speed, and the writing and reading operations of the RAM are controlled so that the time difference between the N-time normal speed of the system and the normal speed output of data is absorbed with the output data being continuously produced.

Figure 3:
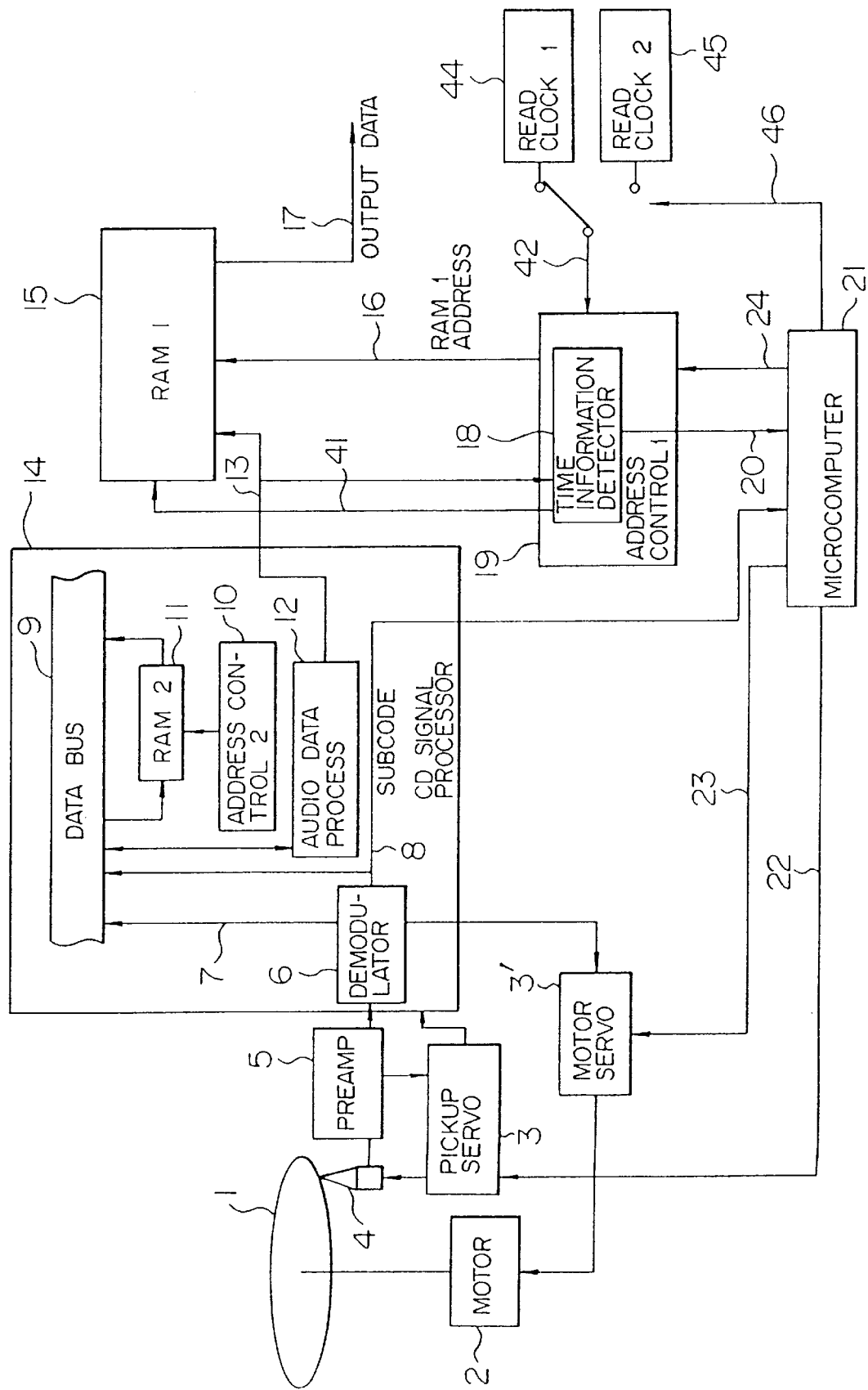
FIG. 3 is a block diagram of the disk reproducing apparatus of FIG. 1, with the CD signal processing circuit shown in detail.
Figure 4:
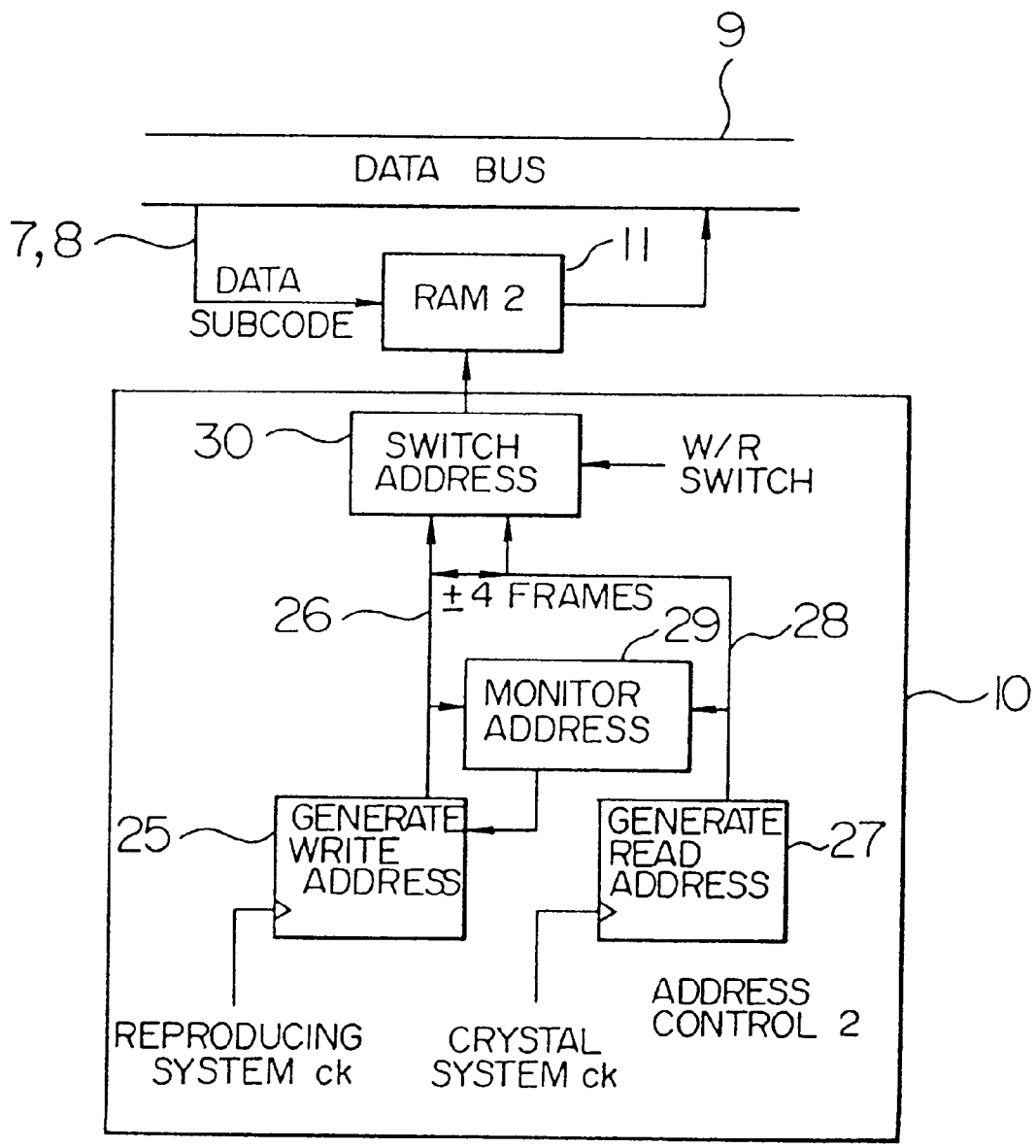
FIG. 4 is a block diagram of the address control circuit-2 10 in FIG. 3.

The CD signal processing circuit of the compact disk (CD) reproducing apparatus of the invention will be described in detail with reference to FIGS. 3, 4 and 5. FIG. 3 shows the CD reproducing apparatus of FIG. 1 with the CD signal processing circuit in detail. In FIG. 3, like elements corresponding to those in FIG. 1 are identified by the same reference numerals. FIG. 4 diagrammatically shows the address control circuit-2 10 shown in FIG. 3, and FIG. 5 diagrammatically shows the address control circuit-1 shown in FIGS. 1 and 3.

Referring to FIG. 3, there are shown a demodulating circuit 6 for demodulating the reproduced data, audio data 7, a data bus 9, the address control circuit-2 10 for controlling the write/read address to the RAM, a RAM-2 11 for storing the reproduced data, and an audio data processing circuit 12 for making a certain process on the audio data. Referring to FIG. 4, there are shown a write address generator 25 for generating the write address to the RAM-2, the write address 26 to the RAM-2, a read address generator 27 for generating the read address to the RAM-2, the read address 28 to the RAM-2, an address monitoring circuit 29 for monitoring the write address 26 and read address 28 to the RAM-2 and controlling the difference to be within ±four frames, and an address switching circuit 30 for switching the write address 26 and the read address 28.

Figure 5:
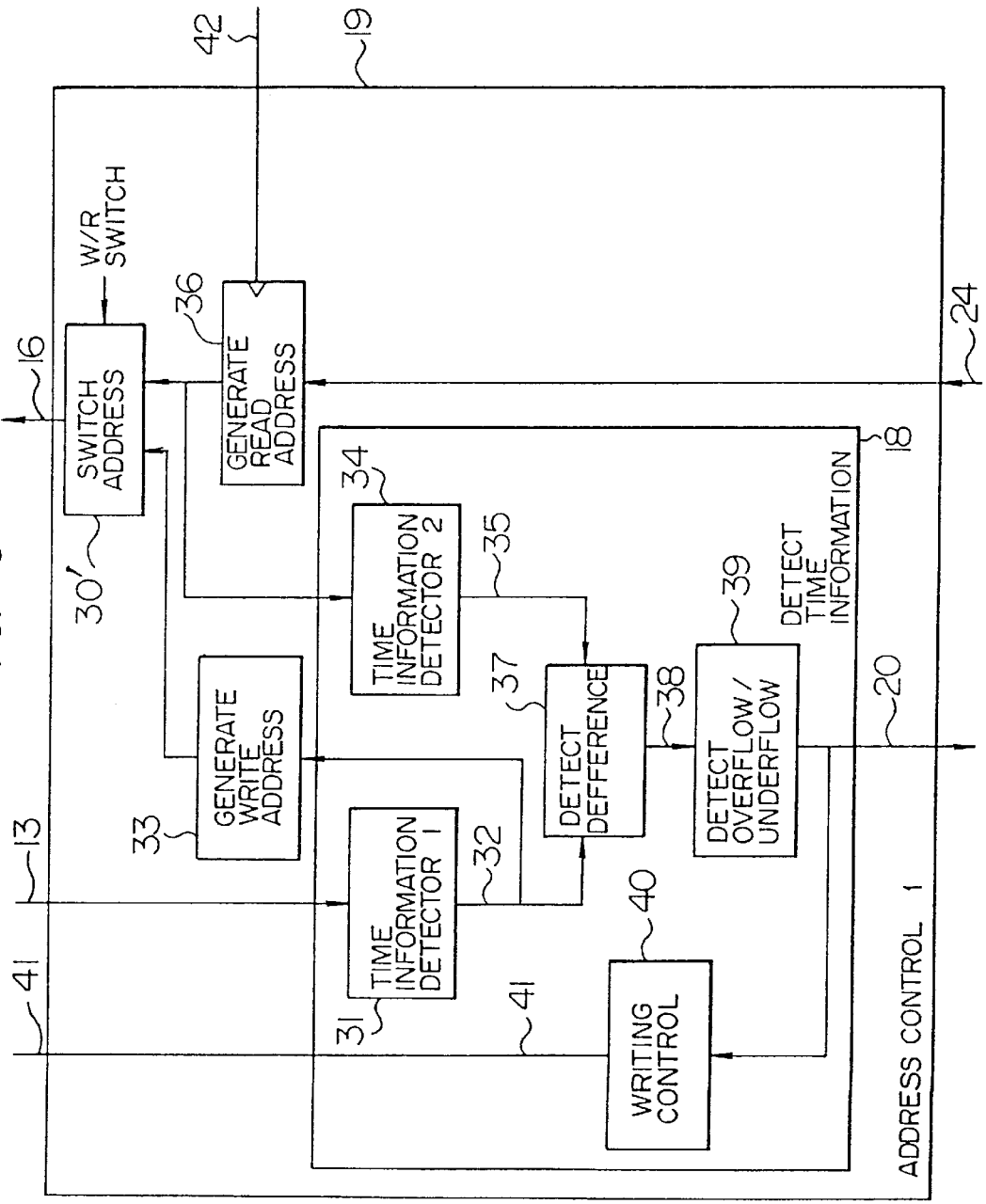
FIG. 5 is a block diagram of the address control circuit 1 in FIGS. 1 and 3.

Referring to FIG. 5, there are shown a time information detecting circuit-1 31 for detecting time information on the basis of the access data 13 produced from the CD signal processing circuit 14, time information-1 32 from the time information detecting circuit-1 31, a write address generator 33 for generating the write address to the RAM-1 on the basis of the time information-1 32, a time information detecting circuit-2 34 for detecting time information indicating when the RAM-1 15 produces an output in response to the address information 16, time information-2 35 from the time information detecting circuit-2 34, a read address generator 36 for generating the read address to the RAM-1 15 on the basis of the time information-2 35, a difference detecting circuit 37 for detecting the difference between the time information-1 32 and the time information-2 35, the difference information 38 from the difference detecting circuit 37, an overflow/underflow detecting circuit 39 for detecting the overflow and underflow of the RAM-1 15 on the basis of the difference information 38, a write control circuit 40 for inhibiting the RAM-1 15 from writing upon overflow and releasing it from the inhibited state upon underflow on the basis of the overflow/underflow information 20 of the RAM-1 15, and write information 41 from the write control circuit 40.

The operation of those constructions will be mentioned below.

Referring to FIG. 3, the disk 1 is rotated by the motor 2, and the pickup 4 is controlled to read data and to supply it through the preamplifier 5 to the CD signal processing circuit 14 by the pickup servo 3. The reproduced data to the input of the CD signal processing circuit is demodulated by the demodulating circuit 6 into the audio data 7 and the subcode 8. The subcode 8 is directly passed through the CD signal processing circuit 14. The audio data 7 is written in the RAM-2 11 under the control of the address control circuit-2 10 so that the jitter due to the disk rotation irregularity is absorbed and that the error correction and interleaving process can be made by the audio data processing circuit 12. At this time, the subcode 8 is written in the RAM-2 11 together with the audio data 7. The audio data 7 and subcode 8 written in the RAM-2 11 are read from the RAM by the address control circuit-2 10. The audio data 7 is subjected to an interpolation process in the audio data processing circuit 12, and then produced from the CD signal processing circuit 14 as the access data 13 with the subcode added.

The operation of the address control circuit-2 10 will be further described with reference to FIG. 4. As shown in FIG. 4, the write address 26 to the RAM-2 11 is generated from the write address generator 25 at a reproducing system clock synchronized with the reproduced signal. The read address 28 to the RAM is generated from the read address generator 27 at a crystal oscillation clock. The subcode in the prior art is not written in the RAM but produced timely with the disk reading operation in order to occur at the position where the disk is read. In the invention, the subcode 8 as well as the audio data 7 is written in and read from the RAM-2 11 through the data bus 9. At this time, the write address 26 and the read address 28 are switched by the address switching circuit 30. The address monitoring circuit 29 maintains the distance between the write address and the read address to be within ±four frames to absorb the disk rotation irregularity.

The time information detector 18 of the address control circuit-1 19 detects time information from the access data 13 as shown in FIG. 3, data is fully written in the RAM-1 15 and stopped from being written therein. The time information detector 18 detects time difference information on the basis of the access data 13 and disk reading information 24. On the basis of the detected time difference information, it monitors whether the RAM-1 15 overflows or not, detects the address for the next continuous data, and supplies to the system control microcomputer 21 the overflow/underflow information 20 for reaccess to the disk.

The operation of the address control circuit-1 19 including the time information detector 18 will be further described with reference to FIG. 5. In the time information detector 18, as shown in FIG. 5, the time information detecting circuit-1 31 detects the time information of the access data 13 from the CD signal processing circuit 14, and the time information detector-2 34 detects the time information at the time of producing audio output from the read address to the RAM-1 15 which is generated on the basis of the disk reading information 24. The write address generator 33 generates a write address to the RAM-1 15 on the basis of the time information-1 32 from the time information detector-1 31. The read address is generated from the read address generator 36 at a rate of a read clock 42 on the basis of the disk reading information 24 from the system control microcomputer 21. The address switching circuit 30' switches the write address signal and the read address signal and produces the address information 16. The difference detector 37 detects the difference between the time information-1 32 for generation of the write address and the time information-2 35 which is produced on the basis of the read address, and produces difference information 38. The overflow/underflow detector 39 detects overflow/underflow information of the RAM-1 15 on the basis of the difference information 38. The write control circuit 40 produces the write inhibit information 41 upon overflow on the basis of the overflow/underflow information 20 of the RAM-1 15.

The overflow/underflow information 20 and the subcode 8 at the time of write inhibition are used by the system control microcomputer 21 so that it produces the intermittent access information 22, 23. Thus, the pickup servo 3 controls the pickup 4 to move to the position where the next data is read to be continuous to the previous data.

When the overflow/underflow detector 39 detects the underflow, the write control circuit 40 produces the write inhibit releasing information 41, and the next data to be continuous to the previous data is read by the pickup 4, subjected to each process and started to be rewritten in the RAM-1 15.

According to this embodiment, since the audio data produced from the CD signal processing circuit has time information added, the junction between data can be precisely detected, and since the time difference can be absorbed by the external RAM other than the CD signal processing circuit, the output data can be continuously reproduced.

Figure 6:
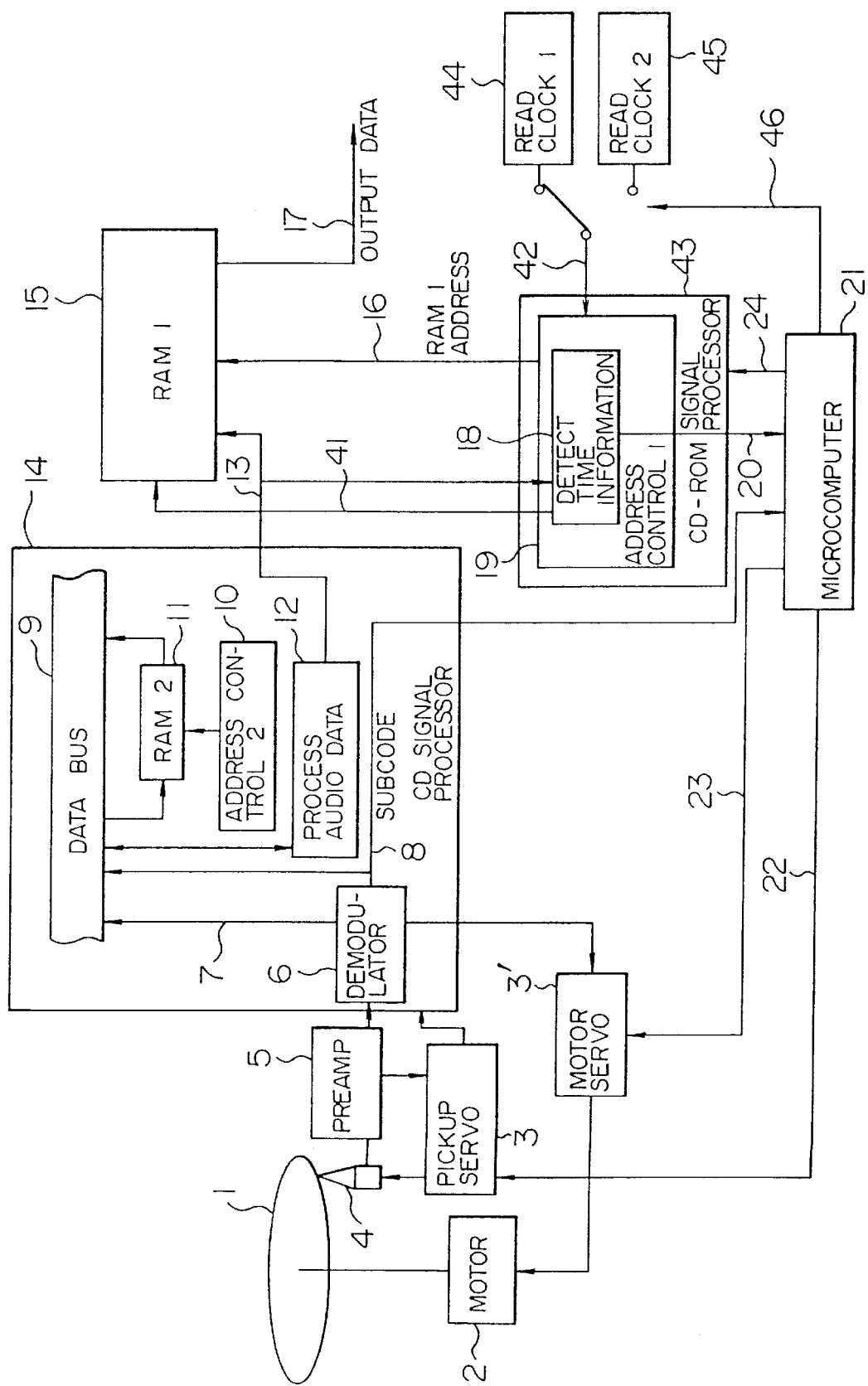
FIG. 6 is a CD-ROM disk reproducing apparatus according to the present invention.

Another embodiment of the invention, or a CD-ROM reproducing apparatus will be described with reference to FIGS. 6 and 7. FIG. 6 is a block diagram of a CD-ROM disk reproducing apparatus. In FIG. 6, like elements corresponding to those in FIGS. 1 and 3 are identified by the same reference numerals. FIGS. 7A and 7B are timing charts useful for explaining the operation of the address control circuit-1 19 shown in FIG. 6 and which are respectively provided for the twice normal speed writing and reading and for the twice normal speed writing and normal speed reading.

Referring to FIG. 6, reference numeral 43 represents a CD-ROM signal processing circuit having the address control circuit-1 19 with the time information detector 18.

The construction shown in FIG. 6 is able to reproduce data at twice normal speed from the CD-ROM disk which is worth using as a data base. When a CD disk for music signals is reproduced by this construction, the signal processor operates at twice normal speed, and the output data is produced at the normal speed. The CD-ROM is the system for managing data in sector units of 98 frames each. Thus, in order to reproduce a CD on the CD-ROM reproducing apparatus, it is necessary that a signal similar to the sector number be added to the reproduced data from the CD.

The operation will be described with reference to FIG. 6 and FIGS. 7A and 7B.

When a data disk is treated, whether data is audio data or not is decided from the subcode 8, and the system control microcomputer 21 generates a switching signal 46 and thereby selects the generator-2 for a twice-normal speed read clock, so that the output data 17 is produced at twice normal speed as shown in FIG. 7A.

When a audio disk is treated, whether data is audio data or not is decided from the subcode 8, and the system control microcomputer 21 produces the switching signal 46 and thereby selects the generator-1 for a normal speed read clock, so that the output data 17 is produced at the normal speed as shown in FIG. 7B. The signal processing system for CD-ROM operates at twice normal speed, and data is written in the RAM-1 15 at twice the normal speed. Upon reading, data is read from the RAM-1 15 at the normal speed (one time normal speed), and thus the RAM overflows before all data are read. According to the idea of the invention, since the audio data 7 is added with the subcode 8 of 98 frame units which includes time information and produced from the CD signal processing circuit 14, data of sector units can be managed. Thus, the correct junctions can be detected for the detection of time difference, and the RAM-1 15 absorbs the time difference between the twice normal speed of the system and the normal output speed of the output data 17. In FIGS. 7A and 7B, data stored last in the first storage means before time point (A) is represented by n+k. In addition, j represents an integer larger than zero. The number of the sector in the other period between time points (A) and (B) is increased one by one at every period T.

According to this embodiment, since the access data 13 has the subcode of 98 frame units, the access data 13 is written in the RAM-1 15, and the address control circuit-1 19 of the CD-ROM signal processing circuit 43 detects the time difference between the output data and the access data. Also, the overflow/underflow of the RAM-1 15 is measured and the intermittent access information 22, 23 are fed to the servos. The time is again detected for the detection of correct junctions. Thus, this embodiment can be used as the CD-ROM system in which data is written in the external RAM at N times the normal speed and read at the normal speed, and the circuits can be shared by both systems.

In addition, this invention can be applied to the minidisk (MD) system in which data is compressed to ⅕ the original size.

According to this invention, even if an intermittent access is made due to the track jump or the like, the junction of the data can be precisely detected since time information is added to the data which is produced from the signal processor, and thus the output data can be continuously produced.

Moreover, when data is once written in the external RAM, and then read therefrom, the time difference between the written data and the read data is detected. When the overflow of the RAM is detected, the RAM is inhibited from being written. The correct junction of data is detected, and the pickup is moved to the corresponding position. When the underflow is detected, the RAM is released from the write-inhibited state, and an intermittent access is made to resume the writing operation. Thus, even though data is written in the RAM at N times the normal speed and read at the normal speed, the output data can be continuously produced.

What is claimed is:

1. A reproducing apparatus for reproducing a recording medium on which data including at least an identifying signal containing a physical address of the recording medium and information data are recorded, comprising:

a pickup for reading said data from said recording medium;

a signal processing circuit outputting said identifying signal demodulated from said data read by said pickup and outputting a signal in which said demodulated identifying signal is added to said information data demodulated from the data read from said pickup;

a memory storing said signal in which the demodulated identifying signal is added to the information data; and control means for controlling the read position of said pickup on said recording medium using an identifying signal from said signal processing circuit and the identifying signal once stored in said memory.

2. A reproducing apparatus according to claim 1, wherein said identifying signal stored in said memory includes a physical address which corresponds with said information data in a one-to-one corresponding relation.

3. A reproducing apparatus according to claim 1 wherein said identifying signal stored in said memory is added to each sector of said information data.

4. A reproducing apparatus according to claim 2 wherein said identifying signal stored in said memory is added to each sector of said information data.

5. A reproducing apparatus for reproducing a recording medium on which data including at least an identifying signal containing a physical address of the recording medium and information data are recorded, comprising:

a pickup for reading said data from said recording medium;

a signal processing circuit outputting said identifying signal demodulated from said data read by said pickup and outputting a signal in which said demodulated identifying signal is made to correspond to predetermined subdivisions of said information data demodulated from the data read from said pickup;

a memory storing said signal including the demodulated identifying signal corresponding to predetermined subdivisions of the information data; and control means for controlling the read position of said pickup on said recording medium to read next said data, using an identifying signal from said signal processing circuit and the demodulated identifying signal of said signal stored in said memory.

6. A reproducing apparatus for reproducing a recording medium on which data including at least identifying data containing a physical address of the recording medium and information data are recorded, comprising:

a pickup for reading said data from said recording medium;

a signal processing circuit outputting said identifying data demodulated from said data read by said pickup and corresponding said demodulated identifying data with predetermined subdivisions of said information data demodulated from the data read from said pickup;

a memory storing ones of said demodulated identifying data together with corresponding predetermined subdivisions of said information data; and control means for controlling the read position of said pickup on said recording medium to read next said data, using an identifying signal from said signal processing circuit and the identifying data of said signal data stored in said memory.

* * * * *